United States Patent
Boone et al.

(10) Patent No.: US 10,816,964 B1
(45) Date of Patent: Oct. 27, 2020

(54) SELF-RECOVERING ORCHESTRATOR FOR CONTROL SYSTEMS

(71) Applicant: Amazon Technologies, Inc., Seattle, WA (US)

(72) Inventors: Stephen Boone, Windham, MA (US); Joshua Davis, Medford, MA (US); David Levy, Somerville, MA (US)

(73) Assignee: Amazon Technologies, Inc., Seattle, WA (US)

(*) Notice: Subject to any disclaimer, the term of this patent is extended or adjusted under 35 U.S.C. 154(b) by 161 days.

(21) Appl. No.: 15/950,460

(22) Filed: Apr. 11, 2018

(51) Int. Cl.
*G05B 23/02* (2006.01)
*G05B 19/41* (2006.01)
*G05B 19/418* (2006.01)

(52) U.S. Cl.
CPC ..... *G05B 23/0259* (2013.01); *G05B 19/4185* (2013.01); *G05B 2219/31115* (2013.01)

(58) Field of Classification Search
CPC ............ G05B 23/0259; G05B 19/4185; G05B 2219/31115
See application file for complete search history.

(56) References Cited

U.S. PATENT DOCUMENTS

| | | | |
|---|---|---|---|
| 9,008,839 B1* | 4/2015 | Kuffner, Jr. ............ | B25J 9/0084 700/248 |
| 9,781,270 B2* | 10/2017 | Hollenberg ......... | H04M 3/5233 |
| 10,129,172 B1* | 11/2018 | Stafford ................. | H04L 67/34 |
| 2008/0167933 A1* | 7/2008 | Hoffman .............. | G06Q 10/087 705/28 |
| 2012/0296875 A1* | 11/2012 | Kwiatkowski .......... | G06F 17/24 707/684 |
| 2013/0159691 A1* | 6/2013 | Neuer ....................... | G06F 8/61 713/100 |
| 2014/0016457 A1* | 1/2014 | Enyedi .................... | H04L 45/16 370/225 |
| 2014/0246917 A1* | 9/2014 | Proud ................ | A61B 5/02405 307/104 |
| 2014/0247151 A1* | 9/2014 | Proud .................. | A61B 5/0024 340/870.02 |
| 2015/0264122 A1* | 9/2015 | Shau ..................... | G06F 9/4881 709/203 |
| 2016/0353360 A1* | 12/2016 | Lee ........................ | H04W 48/16 |
| 2017/0005515 A1* | 1/2017 | Sanders ................. | H02J 3/381 |
| 2017/0258401 A1* | 9/2017 | Volpe ................... | A61B 5/6805 |
| 2019/0208021 A1* | 7/2019 | Yang ....................... | H04L 41/00 |

* cited by examiner

*Primary Examiner* — Ziaul Karim
(74) *Attorney, Agent, or Firm* — Patterson + Sheridan, LLP (57) ABSTRACT

Embodiments herein describe a fault tolerant network connected orchestrator which can handle network outages or hardware resets in a work cell. In one embodiment, the orchestrator determines the next task to assign to the work cell depending on whether the previous task was successfully completed. However, a network outage or a hardware failure may prevent the orchestrator from receiving the results of the previous action from the work cell. In one embodiment, the orchestrator recovers from a communication error by requesting the current state of sensors. Using this information, the orchestrator can deduce or determine the current state of the work cell and determine the next task for the work cell. In this manner, the orchestrator is fault tolerant such that it can recover from communication errors.

19 Claims, 6 Drawing Sheets

SELF-RECOVERING ORCHESTRATOR FOR CONTROL SYSTEMS

BACKGROUND

The present invention relates to a fault tolerant network connected orchestration component for controlling a work cell.

Industrial automation systems typically use a local controller in the form of a Programmable Logic Controller (PLC) or Industrial Personal Computer (IPC) that directly controls the automated machines involved in the automation (e.g., robotic arms, conveyance devices, labeling devices, etc.). These local controllers also receive direct input from sensing devices (presence sensors, barcode readers, vision systems, etc.). The sensors, the automated machine, and the local controller form a work cell. A facility or warehouse may include hundreds of work cells that perform a range of tasks.

As industrial automation systems become more advanced, it becomes beneficial to orchestrate these control systems from network connected orchestration components. That is, instead of most of the logic for operating the work cell being located in the local control component, the logic is moved to the network connected orchestration component which may provide a more user friendly software deployment interface. However, relying on a network connected orchestration component means the operability of the work cell is dependent on the network connecting the work cell to the network connected orchestration component. Dropped packets or other network outages can prevent the network connected orchestration component from receiving updates from the work cell.

DETAILED DESCRIPTION

Embodiments herein describe a fault tolerant network connected orchestration component (referred to herein as "the orchestrator") which can handle network outages or hardware resets in the work cell. Using the orchestrator provides many advantages such as a more user-friendly software deployment interface (and access to more advanced programming languages), access to less expensive compute resource, and easier integration with other network-based services; however, as discussed above, dropped packets or other network outages can prevent the orchestrator from properly controlling the work cell. For example, the orchestrator may determine the next task to assign to the work cell depending on whether the previous task was successfully completed. If a network error (e.g., one or more dropped packets) or a hardware outage (e.g., a reset of the local controller) prevents the orchestrator from receiving a message from the local controller containing the results of the previous action, the orchestrator may not know the next step to take.

In one embodiment, the orchestrator recovers from a network or hardware outage by requesting that the local controller report the current state of sensors in the work cell. When the orchestrator determines there was a communication error (whether from a network or hardware outage), the orchestrator can request the sensor data from the local controller and whether the automated machine is in a ready to work state. Using this information, the orchestrator can deduce or determine the current state of the work cell. In one embodiment, the orchestrator uses the state of the work cell to infer the results of performing the previous task and then determine the next task for the work cell. In this manner, the orchestrator is fault tolerant such that it can recover from communication errors.

Figure 1:
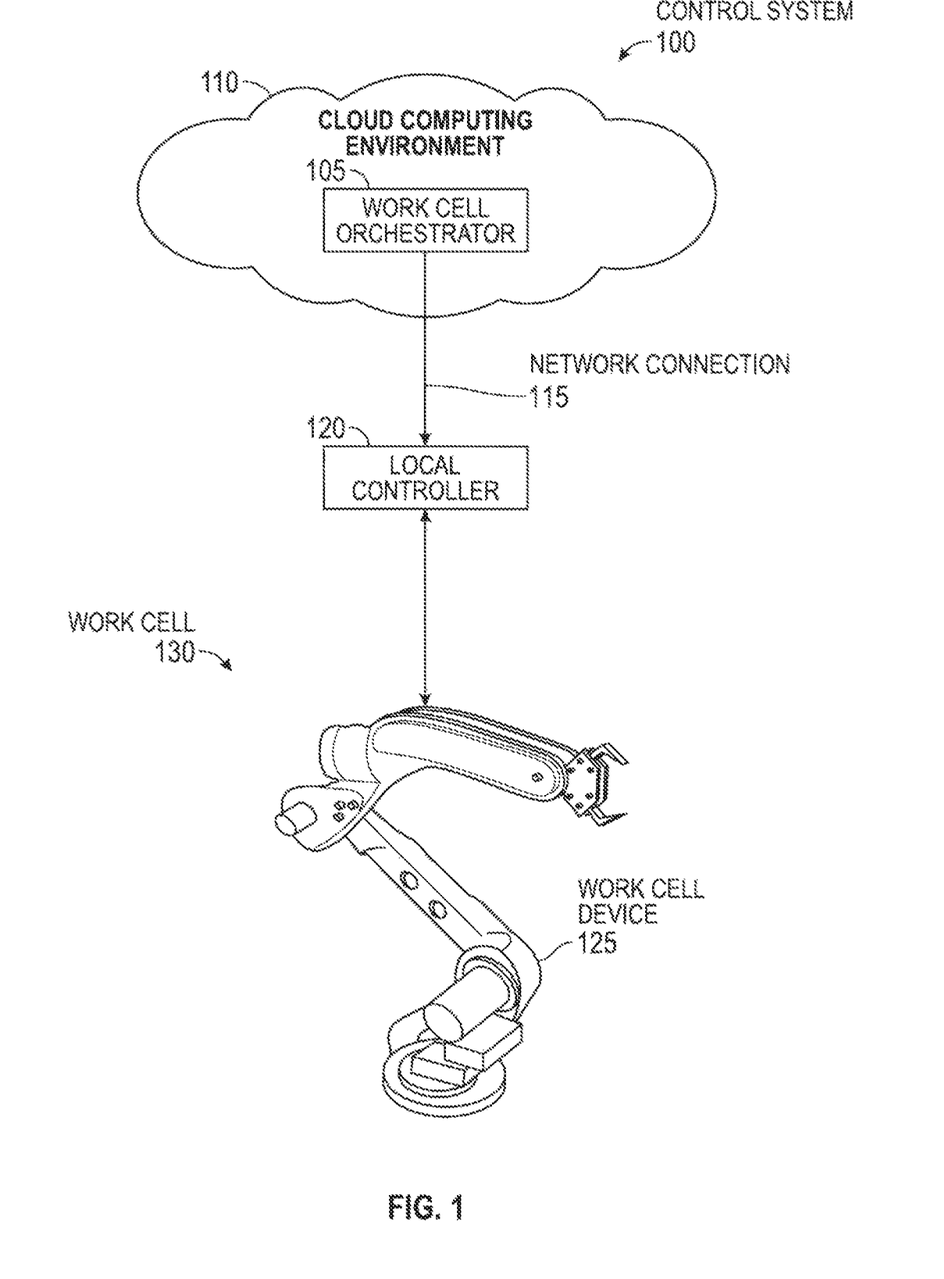
FIG. 1 illustrates a control system for controlling a work cell device using a remote work cell orchestrator, according to various embodiments.

FIG. 1 illustrates a control system 100 for controlling a work cell device 125 using a remote work cell orchestrator 105, according to various embodiments. As shown, the work cell orchestrator 105 (e.g., a network connected orchestration component) is communicatively coupled to a work cell 130 by a network connection 115. In this example, the orchestrator 105 is disposed in a cloud computing environment 110 (also referred to as "the cloud") and thus, can be referred to as a cloud-based orchestrator in this example. The cloud 110 can include a plurality of distributed computing resources which hosts or executes the orchestrator 105. In one embodiment, the cloud 110 includes compute resources that are remote from the work cell 130. For example, the work cell 130 may be disposed within a facility or warehouse while the cloud 110 is formed using remote data centers. As mentioned above, hosting the work cell orchestrator 105 in the cloud 110 may reduce cost since compute resources are less expensive than disposing compute resources at the physical location of the work cell 130. Further, the orchestrator 105 may be a software application deployment that is deployable using more advanced programming languages (e.g., C, C++, Java, etc.) than the programming language(s) used to configure a local controller 120 in the work cell 130. Because these advanced programming languages are more commonly known, there may be more people with the requisite skills to deploy and configure the orchestrator 105 when compared to the number of people who can configure the local controller 120 (e.g., a PLC or IPC). Further, by deploying the orchestrator 105 in the cloud 110, the orchestrator 105 may better integrate with other network-based services compared to the local controller 120.

In the control system 100, most of the logic for operating the work cell 130 is contained within the work cell orchestrator 105 rather than the local controller 120. Moving most of the logic to the orchestrator 105 results in the benefits recited above and enables the work cell 130 to perform more complicated automation algorithms. However, the orchestrator 105 is vulnerable to errors and outages in the network connection 115. For example, if a router or switch in the network connection 115 becomes overloaded or fails and a communication packet sent from the local controller 120 to the orchestrator 105 is dropped or lost, the orchestrator 105 may not know the next step or instruction to send to the work cell 130. Another example of a communication error is a hardware failure or reset. For example, the local controller 120 may fail which causes it to reset. During that time, status messages from the work cell device 125 to the local controller 120 may be lost. When the local controller 120 is back online and communication is re-established with the orchestrator 105, the status messages may never be relayed to the orchestrator 105.

The control system 100 can be fault tolerant from network errors or outages by using a guaranteed message delivery service (e.g., message duplication and guaranteed message ordering) so that the orchestrator 105 always receives the lost messages or information. However, guaranteed message delivery services tend to introduce significant implementation complexity that may exceed the capabilities of the software and hardware in the system 100 (such as the hardware in the local controller 120). Further, a guaranteed message delivery service does not help when there is failure in the local controller 120 (e.g., a controller outage or hardware reset). In one embodiment, to recover from network and controller outages, the local controller 120 is programmed to perform a minimum set of functions. In one embodiment, those functions include: (1) reporting to the orchestrator 105 when the work cell device 125 changes from a ready-to-work state to a not-ready-to work when, e.g., the device 125 starts a task or enters a faulted state, (2) reporting to the orchestrator 105 when the device 125 changes from the not-ready-to-work state to the ready-to-work state when, e.g., the device 125 completes a task or exits a faulted state, and (3) reporting to the orchestrator 105 whether the device 125 is ready-to-work when this information is requested by the orchestrator 105.

In addition to these functions which are used when recovering from network or controller outages, the local controller 120 may perform other functions such as (1) accepting device task requests from the orchestrator 105, (2) reporting the result of performing the device task to the orchestrator 105, (3) reporting changes in sensor data, and (4) report current sensor data upon request from the orchestrator 105. However, these functions are only an exemplary list of functions that may be performed by the local controller 120 during normal operations and when recovering from a network or controller outage. The local controller 120 may perform other functions than the ones listed.

In FIG. 1, the work cell device 125 includes a robotic arm that may be used to pick up or move items such as components in a manufacturing line or packages in a sorting or shipping warehouse. In other embodiments, the work cell device 125 may include other active devices or automated machines such as conveyance devices, labeling devices, and the like. Using tasks received from the orchestrator 105, the local controller 120 provides instructions to the work cell device 125 for performing a particular task such as moving an item, banding an item, placing a label on an item, sorting an item, and the like. Using data returned from the device 125, the local controller 120 can determine whether the task was, or was not, completed successfully and report the results to the orchestrator 105. Although FIG. 1 illustrates a one-to-one relationship between the local controller 120 and the work cell device 125, in other examples the local controller 120 can operate multiple work cell devices 125 (e.g., a one-to-many relationship).

Figure 2:
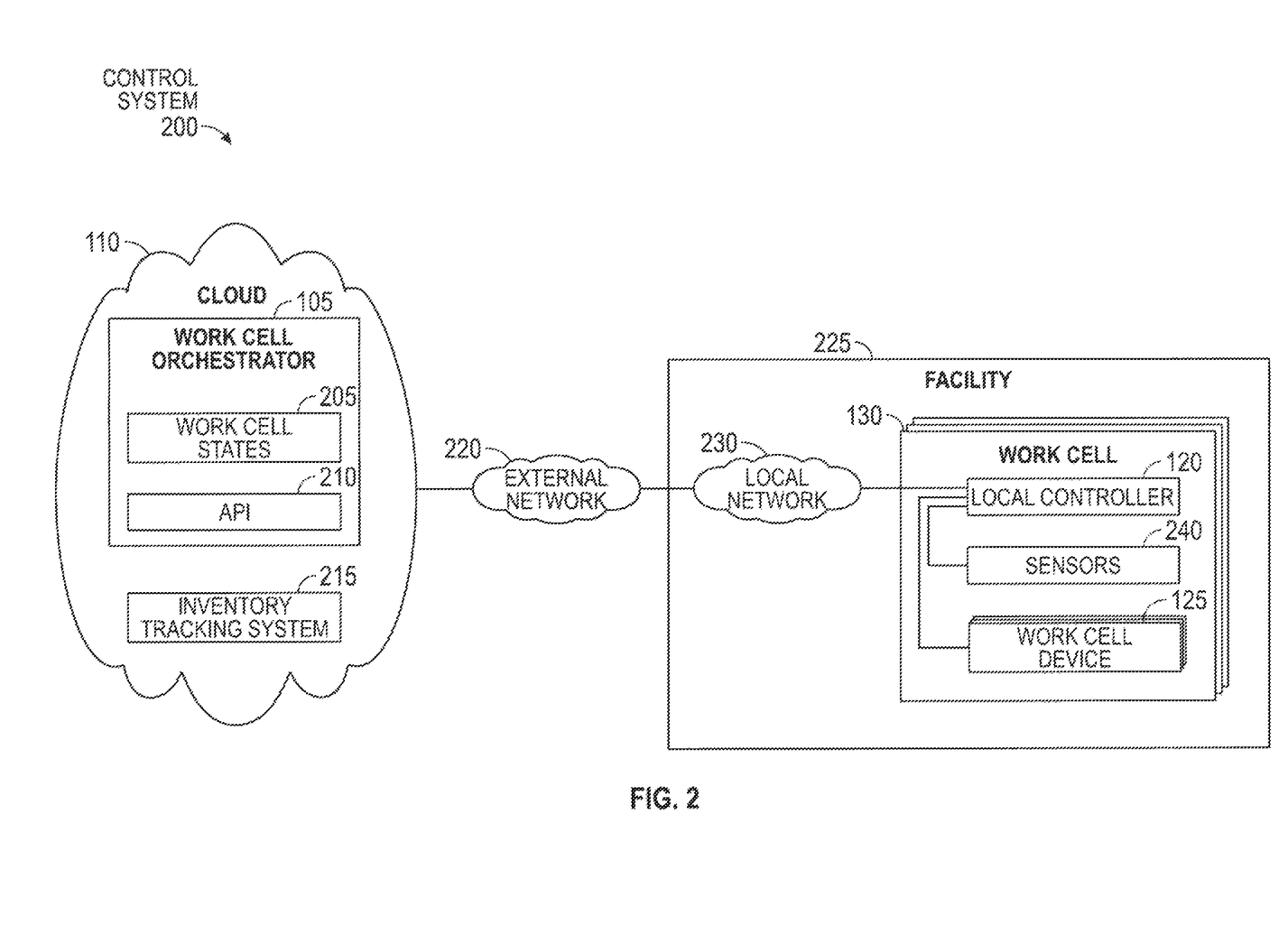
FIG. 2 illustrates a control system for controlling work cell devices using a remote work cell orchestrator, according to various embodiments.

FIG. 2 illustrates a control system 200 for controlling work cell devices 125 using a remote work cell orchestrator 105, according to various embodiments. The control system 200 includes the cloud 110 which is communicatively coupled to a facility 225 which contains a plurality of work cells 130. That is, the cloud 110 is coupled to an external network 220 which can be a public wide access network (WAN) such as the Internet. The external network 220 is coupled to a local network 230 in the facility 225. The local network 230 can be a private or secure communication network (e.g., a local access network (LAN)) which is coupled to a local controller 120 in each of the work cells 130. In one embodiment, the local network 230 can be a site network fabric for communicating with various components in the facility 225.

In addition to being connected to the work cell device 125 (or devices), the local controller 120 is coupled to sensors 240. The connections between the local controller 120 and the sensor 240 and between the local controller 120 and the work cell device 125 can be direct connections as shown (e.g., using cables) or may be indirect connections that rely on the local network 230 to provide communication between the local controller 120 and the sensors 240 and between the local controller 120 and the work cell device 125. For example, the local network 230 can include one or more network devices (e.g., a switch or router) for moving data between the local controller 120, the sensors 240, and the work cell devices 125. In one embodiment, each of the work cells 130 include its own local controller 120. However, in another embodiment, a local controller 120 may be shared by a plurality of work cells 130. Stated differently, the local controller 120 may independently control the sensors 240 and work cells devices 125 in multiple work cells 130.

In one embodiment, the facility 225 is a warehouse for sorting and shipping packages to customers or to other warehouses. For example, the work cell device 125 may be a robotic arm that moves or sorts packages. In another example, the work cell device 125 may be a portion or segment of a conveyor belt which includes actuators for moving packages between different chutes or onto other conveyor belts. In yet another example, the work cell device 125 may be labeler which applies labels with mailing addresses onto packages. In any of these examples, the work cell devices 125 can receive instructions from the work cell orchestrator 105 to perform a task such as moving a particular package, picking up a package, sorting a package, applying a label to a package, and the like.

In another embodiment, the facility 225 is a manufacturing facility that produces a product (e.g., an assembly line or an assembly process that involves various optional steps defined by a programmatically accessed build sheet). The work cell devices 125 may include a plurality of robotic arms that perform one or more steps for assembling the products such as attaching a component to an assembled portion of the product, testing the assembled product or a component thereof, and the like.

The sensors 240 generate information as packages or components pass through the work cell 130. For example, the sensors 240 may be optical sensors or pressure sensors disposed along the conveyor belt (e.g., a type of device 125) which indicate where along the belt an item is located. The sensors 240 could be bar code readers that scan identification information as an item enters and leaves the work cell 130. In another example, the sensors 240 are attached to a work cell device 125 to determine the state of the device 125, e.g., whether the device 125 is currently holding an item, where the device 125 has placed an item, or any faults in the device 125. In this manner, the sensors 240 can be used to track items in the work cell 130 and determine whether a device 125 has moved an item to a different location within the work cell 130. Further, the sensors 240 can provide status information about the work cell devices 125 either directly (because the sensors 240 are embedded within the devices) or indirectly by viewing the actions of the devices 125 or the results of the actions of the devices 125 on items in the work cell 130. Other examples of the sensors 240 include vision systems, optical eye beams, RFID detectors, and the like.

Although the work cells 130 each include a work cell device 125 (e.g., an automated machine that performs some kind of action), other types of work cells 130 may include only passive devices—e.g., only the sensors 240. For example, the sensors 240 may scan items as they enter the work cell 130 and report that information to the orchestrator 105. That is, the work cell 130 may be a scan tunnel that uses bar code or radio frequency identification (RFID) sensors to identify items entering the facility 225 through a dock door. The orchestrator 105 can use the information provided by the sensors 240 (which may be relayed via the local controller 120) to update a database or provide instructions to other work cells 130.

The cloud 110 includes the work cell orchestrator 105 and an inventory tracking system 215. The orchestrator 105 saves work cell states 205 corresponding to the work cells 130 and includes an application programming interface (API) 210. In one embodiment, the orchestrator 105 uses the information about the work cells 130 provided by the local controllers 120 to update the work cell states 205. As described in more detail below, using the status of the work cell devices 125 and the data captured by the sensors 240, the orchestrator 105 can update the work cell states 205. Using the current states 205 of the work cells 130, the orchestrator 105 can provide new tasks for the work cells 130.

The API 210 provides an interface for a programmer to configure or update the orchestrator 105. For example, the programmer can use the API 210 to update the logic or state machine in the orchestrator 105. In this example, the orchestrator 105 is a software application that can be configured or reconfigured using the API 210. Thus, while the local controller 120 can perform a limited set of functions due to constraints in processing power and the type of programming language, the orchestrator 105 may be programmed using a more advanced programming language and have access to more computing resources in the cloud 110. As such, the logic or state machine in the orchestrator 105 may enable the orchestrator 105 to evaluate data received from the sensors 240 and the devices 125 more thoroughly and make more complicated decisions relative to the local controller 120.

The orchestrator 105 is communicatively coupled to the inventory tracking system 215. As mentioned above, because the orchestrator 105 is executed in the cloud 110, it may be easier to interface the orchestrator 105 with other network components such as the inventory tracking system 215. In one embodiment, the inventory tracking system 215 tracks items moving through the facility 225. For example, if the item is a package that includes an address label, in response to a sensor 240 identifying a bar code of the package, the inventory tracking system 215 can inform the orchestrator 105 the destination for the package (e.g., a zip code or region). In turn, the orchestrator 105 can determine a task for the work cell device 125. For example, if the device 125 is a robotic arm, the device 125 may pick up the package and move it to the appropriate bin for that destination. If the device 125 is a conveyor belt, the device 125 may sort the package into a chute for that destination.

In another example, the inventory tracking system 215 may track parts or components used in assembling a product in the facility 225. When a part is used, the orchestrator 105 can inform the inventory tracking system 215 which can then determine when to re-order parts or request that a human or another work cell 130 provide additional parts. In this manner, the orchestrator 105 can use data or information provided by other external or separate components (e.g., the inventory tracking system 215) to determine how to control the devices 125 in the work cells 130.

Figure 3:
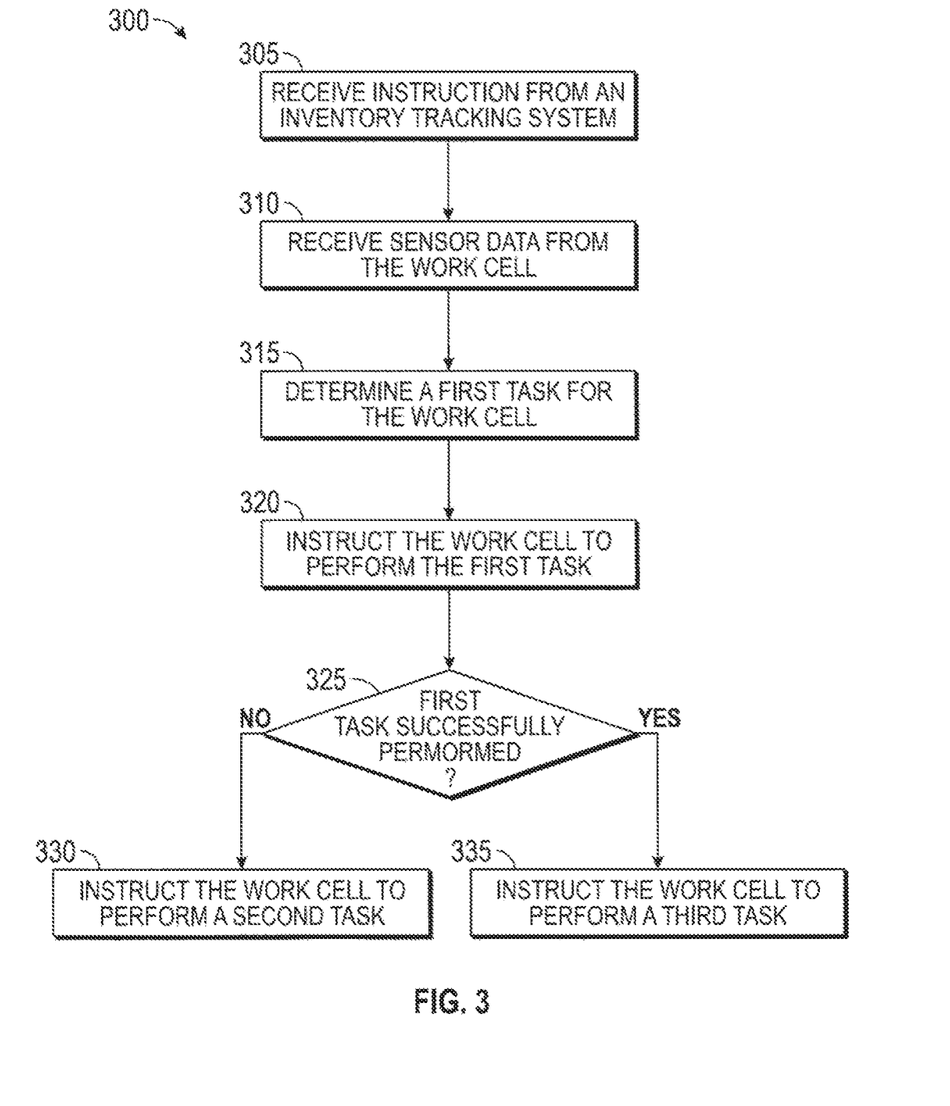
FIG. 3 is a flowchart for controlling a work cell device using a work cell orchestrator, according to various embodiments.

FIG. 3 is a flowchart of a method 300 for controlling a work cell device using a work cell orchestrator, according to various embodiments. At block 305, the orchestrator receives instructions from the inventory tracking system. In this example, the inventory tracking system instructs the orchestrator when and how to move a package through the work cells in the facility to a desired location. The inventory tracking system may tell the orchestrator where the package is currently located and then request that the orchestrator move the package to a desired destination in the facility. The desired destination may be a work cell, a bin, a loading dock, an assembly station, and the like. For example, after scanning the item at a work cell, the orchestrator can send a request to the inventory tracking system with an item ID. The inventory tracking system can then respond with the desired destination.

To get the item to the desired destination, the orchestrator may move the item through a series of work cells. For example, the item may currently be located at the beginning of a system of conveyor belts which is divided into a plurality of different conveyor belt sections in respective work cells. The orchestrator may determine the path the item should take through the various work cells in the conveyor belt system in order for the item to reach its desired destination. However, in other example, the inventory tracking system (rather than the orchestrator) may determine the work cells the item should move through. In that scenario, each time the item arrives at a work cell, the inventory tracking system provides new instructions for the orchestrator for moving the package through that work cell, and so forth.

Although the inventory tracking system is specifically mentioned, the orchestrator can receive instructions from other external services. For example, a human associate may indicate to the orchestrator where an item should be moved in the facility. In another example, an assembly-line controller may determine when it is appropriate for the orchestrator to instruct a work cell to perform a certain action such as attaching a component or testing an already assembled product.

At block 310, the orchestrator receives sensor data from the work cell. The orchestrator can use the sensor data to determine a current state of the work cell. For example, the sensor data can determine where the item is currently located in the work cell. For instance, the work cell may have a plurality of different inputs where items arrive that each has an optical eye or pressure plate to detect the presence of an item. The orchestrator can use the sensor data to identify which of the inputs has the item corresponding to the instruction received from the inventory tracking system.

In another embodiment, the sensor data can indicate the current status of the work cell device. For example, if this is the first time the work cell has been used that day, the orchestrator may not know the current status of the work cell device (e.g., the current position of a robotic arm or the current location of actuators on a conveyor belt). The sensor data can inform the orchestrator of the current location or configuration of the work cell devices.

At block 315, the orchestrator determines a first task for the work cell. In one embodiment, the orchestrator determines a task to assign to the work cell so that the instruction received from the inventory tracking system at block 305 is carried out. For example, the first task may include moving the item down the conveyor belt and onto a neighboring conveyor belt, or picking up the item and placing it in a particular bin or tote. As mentioned, the first task can also be based on the sensor data. For example, the orchestrator may first request that the local controller move the work cell device (e.g., a robotic arm) to a position in the work cell that contains the item. In another example, the first task may include instructing the work cell device to move to a reset position or default state before moving the item.

In one embodiment, the first task is divided into a plurality of smaller incremental tasks which are then transmitted from the orchestrator to the local controller. For example, to move the item from an input to a desired output, the orchestrator may provide a series of smaller instructions to the local controller such as: move the robotic arm to a first position, grasp an item at the first position, move the robotic arm to a second position, and release the item. Alternatively, in another embodiment, the first task may be a high-level task that the local controller then breaks down into the plurality of incremental task that are used to control the work cell device.

At block 320, the orchestrator receives a response from the local controller indicating if the first task was performed successfully. For example, if the first task was to move a pallet from Location A to Location B in the work cell, the local controller may monitor the work cell device and presence sensors at these locations to determine if the pallet was moved successfully. In either case, the local controller can send a message to the orchestrator that contains the results of performing the first task. If the pallet never arrived at the Location B, the message may indicate the work cell failed to perform the first task. In addition, the message may include other information such as the current location of the pallet (e.g., the pallet fell off the work cell device and is now in Location C) or that the work cell device malfunctioned.

In the method 300, the orchestrator uses the results of performing the first task to determine the next task for the work cell. That is, it is often beneficial to receive the results of the first task from a work cell before the next task for that work cell is determined since the subsequent task may depend upon whether the prior task was successful or unsuccessful. That is, some of the tasks performed by the orchestrator may have inter-task dependencies. This inter-task dependency is illustrated in the method 300 by the branch at block 325. If the first task was unsuccessful, the method proceeds to block 330 where the orchestrator instructs the work cell to perform a second task. If the task was successful, the method proceeds to block 335 where the orchestrator instructs the work cell to perform a third task different from the second task. As such, the selection of the next task—i.e., the second or third task—depends on whether the first task was completed successfully.

For example, the first task may have been moving the item to a neighboring work cell. However, if the work cell device moved the item to the incorrect work cell, the orchestrator may identify a corrective task or action for the work cell in order to move the item to the correct neighboring work cell. In another example, if the work cell device was supposed to pick up the item, but was unable to do so, the orchestrator may ask the work cell device to repeat the task using a different setting. For example, the orchestrator may instruct the work cell device to use a stronger grip, or use a different actuator (e.g., a suction device rather than grasping claws).

Because of the inter-dependencies of the tasks when performing the method 300, network outages and controller outages can prevent the orchestrator from learning from the local controller whether the first task was completed successfully at block 325. For example, a network outage may prevent the message containing the results of performing the first task from reaching the orchestrator. In another scenario, the local controller may have failed and was reset when the work cell device was performing the first task, and thus, did not receive the information transmitted by the device indicating whether the first task was successful. In one embodiment, the orchestrator includes a state machine that indicates the next task to perform in response to results of performing the previous task. If the results of the previous task are not known because of a network or controller outage, the orchestrator may be uncertain which task to perform next.

Figure 4:
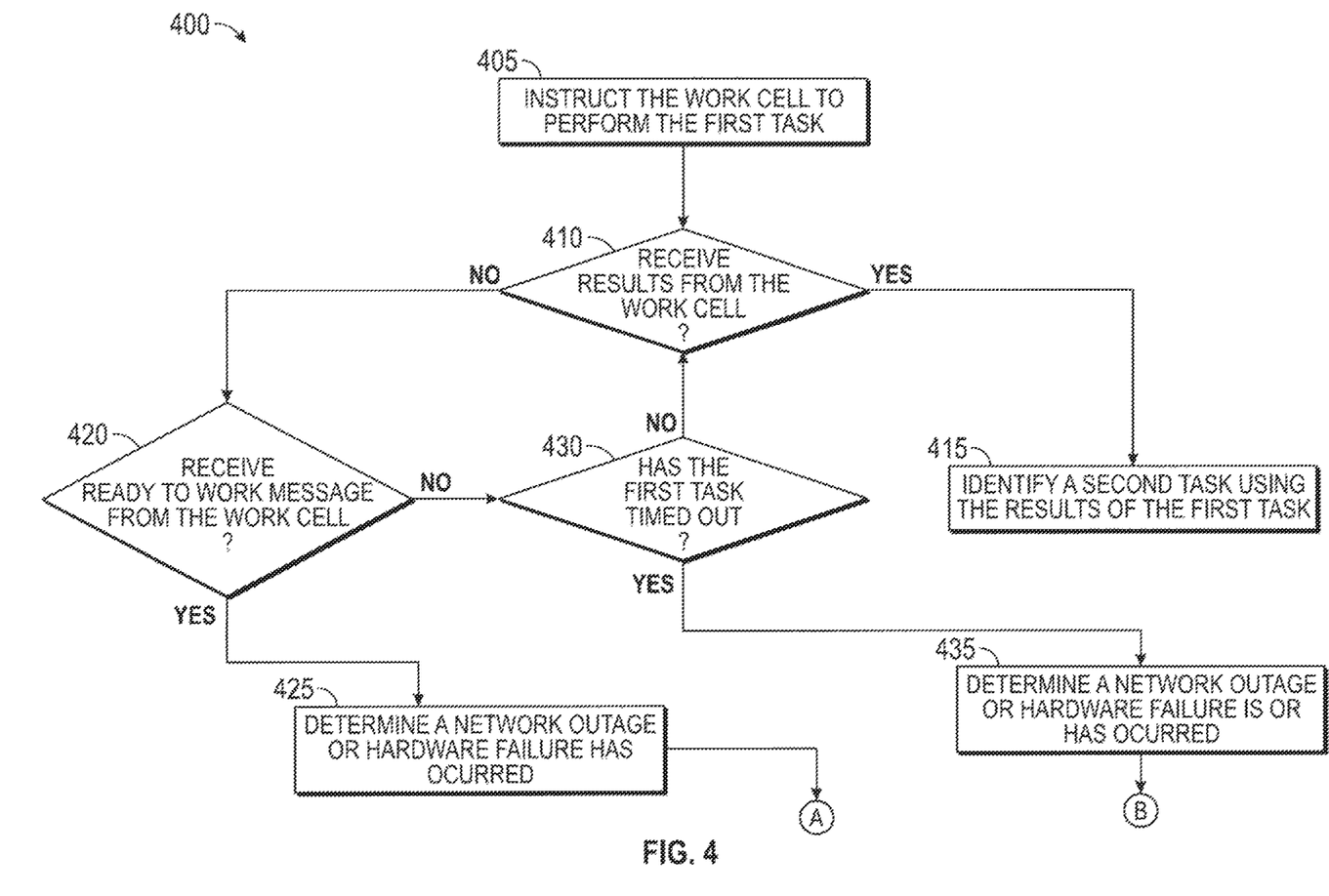
FIG. 4 is a flowchart for detecting a network or controller outage using a remote work cell orchestrator, according to various embodiments.

FIG. 4 is a flowchart of a method 400 for detecting a network outage or a controller outage using a remote work cell orchestrator, according to various embodiments. At block 405, the orchestrator instructs the work cell to perform the first task, e.g., which may be the same as block 320 of the method 300. For example, the first task may be issued in response to sensor data received from the work cell and from instructions received from an external service such as the inventory tracking system.

As mentioned above, a network outage or controller outage can prevent the orchestrator from receiving a message from the local controller that includes the results of performing the first task. The remaining portion of the method 400 provides various techniques for detecting a communication error so that the orchestrator can recover from the network outage or controller outage.

At block 410, the orchestrator determines whether it has received results from the work cell regarding the first task. If the orchestrator has received results, then there was no communication error (i.e., no network or controller outage) and the method 400 proceeds to block 415 where the controller identifies a second task using the results of the first task as discussed in the method 300.

However, assuming the orchestrator has not received results, the method 400 proceeds to block 420 where the orchestrator determines whether it has received a ready-to-work message from the local controller in the work cell. That is, one of the functions of the local controller is to automatically report (i.e., without prompting from the orchestrator) when a work cell device in its control switches from the ready-to-work state to the not-ready-to-work state and when a device switches from the not-ready-to-work state to the ready-to-work state. The local controller may assign the ready-to-work state to a work cell device when the device completes a task assigned by the orchestrator or when the device exits a faulted state. The local controller may assign the not-ready-to-work state when the work cell device starts a task or has entered a faulted stated. For example, although not shown in the method 400, after receiving the first task, the local controller switches the state of the work cell device from the ready-to-work state to the not-ready-to-work state and can report this status update to the orchestrator. After the task is completed successfully or unsuccessfully (and assuming the work cell device is not in a faulted state), the local controller changes the state of the device to ready-to-work.

However, the local controller may report a switch between not-ready-to-work to ready-to-work states after transmitting the result of performing the first task to the orchestrator. Put differently, the local controller may first transmit the results of performing the current task (i.e., whether the task was performed successfully or unsuccessfully) before then determining to switch the state of the work cell device from not-ready-to-work to ready-to-work. As such, if at block 420 the orchestrator receives a ready-to-work message from the local controller but has not yet received the results of performing the first task, the orchestrator knows there has been a communication error from a network or controller outage. As such, the method 400 proceeds to block 425 where the orchestrator determines a network outage or hardware failure (e.g., a controller outage) has occurred. For example, the message or messages containing the result of performing the first task may have been dropped in a network outage that was then resolved before the local controller transmitted the ready-to-work message to the orchestrator.

However, if at block 420 the orchestrator does not receive an indication that the work cell device is ready-to-work, the method 400 proceeds to block 430 where the orchestrator determines whether the first task has timed out. In one embodiment, each task may be assigned a specific time out value, or the orchestrator may use a general time out value for all its tasks. At block 405, the orchestrator may start a timer which is then evaluated at block 430 to determine if the first task has timed out before the orchestrator either receives results from the work cell or a ready-to-work message. Since some tasks may take several seconds and up to a minute to complete, the time out value may be set so that the method 400 does not inadvertently determine the task has timed out when in fact the work cell is still working on completing the task.

If the first task has timed out, the method 400 proceeds to block 435 where the orchestrator determines that a network or controller outage is or has occurred, and as such, the orchestrator has not received the result of performing the first task or received a ready-to-work message. For example, the network outage or the hardware failure (e.g., a controller outage) may have a sufficient duration such that the orchestrator never receives the result of performing the first task, or any ready-to-work messages from the work cell.

However, if the first task has not timed out, the method 400 returns to block 410 to determine whether the results of performing the first task have been received. In this manner, blocks 410, 420, and 430 can repeat until the results are received or the orchestrator determines that there has been a network outage or hardware failure.

Figure 5:
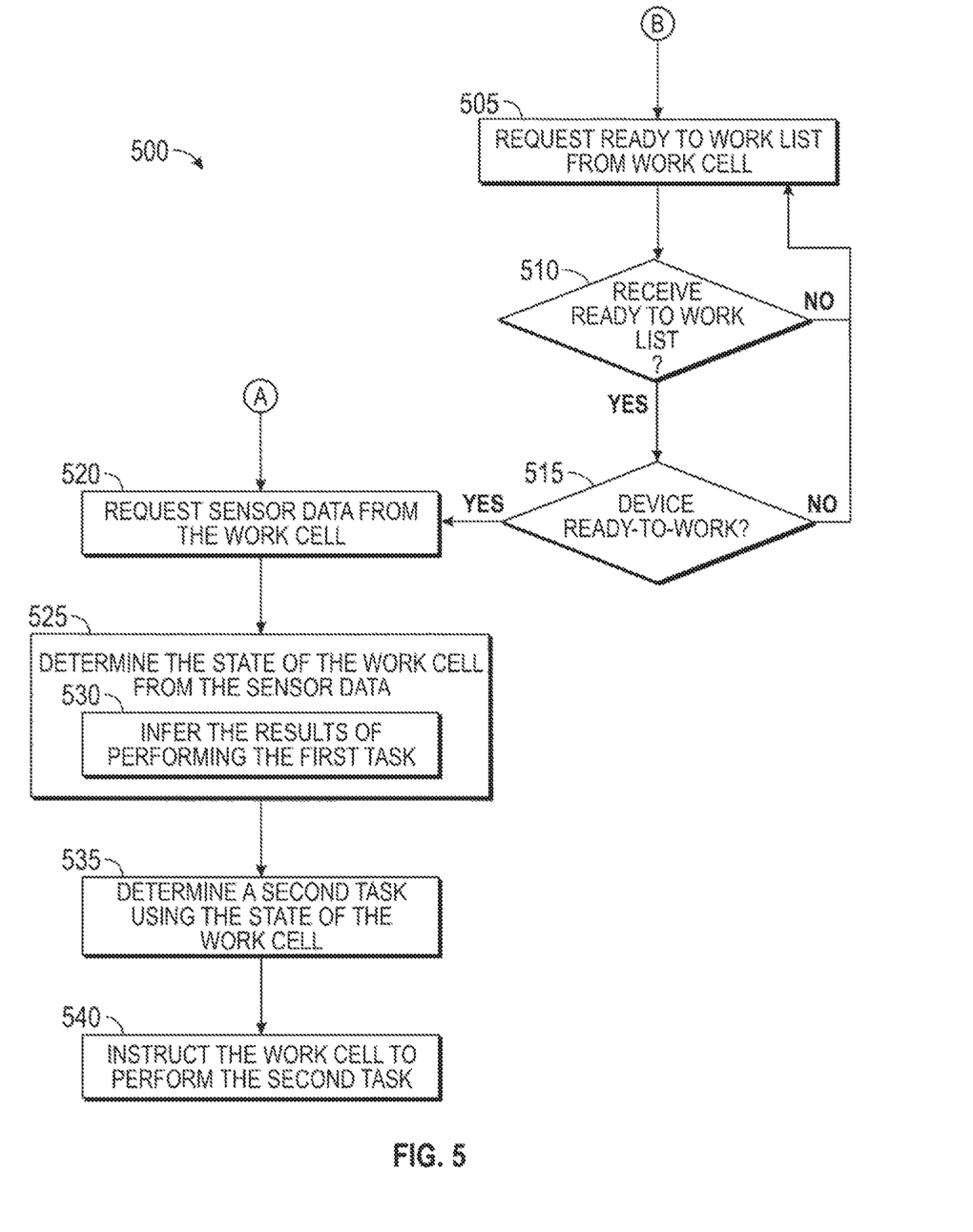
FIG. 5 is a flowchart for recovering from a network or controller outage, according to various embodiments.

FIG. 5 is a flowchart of a method 500 for recovering from a network outage or controller outage, according to various embodiments. Generally, the method 500 provides various techniques for recovering from an outage that results in a communication error as described above in the method 400. Because the outage results in the orchestrator not knowing the result of performing the previous task (e.g., the first task), recovering from the outage means the orchestrator attempts to determine the next task to take when the next task is dependent on the actions performed by the work cell when executing the previous task.

Method 500 can begin either after block 425 of method 400 where the orchestrator determines that a network or controller outage has occurred and the orchestrator has received a ready-to-work message, or from block 435 where the orchestrator determines that a network or controller outage is still occurring or has occurred and the orchestrator has not yet received a ready-to-work message. Assuming the orchestrator has not received the ready-to-work message, the method proceeds to block 505 where the orchestrator requests the ready-to-work list from the work cell. That is, the orchestrator sends a request to the local controller which prompts the controller to determine the current state of the work cell device (or devices) in the work cell. If the orchestrator does not receive the ready to work list at block 510, the method 500 returns to block 505. For example, the orchestrator may wait a few seconds before again requesting the ready to work list from the local controller. Because the control system may still be experiencing the network outage or controller outage during the method 500, blocks 505 and 510 may repeat until eventually the network or controller outage has resolved and the local controller provides the ready to work list to the orchestrator. In one embodiment, receiving the ready to work list at block 510 indicates that a network or controller outage has occurred but has since been resolved such that communication has been re-established between the local controller and the orchestrator.

At block 515, the orchestrator determines, by evaluating the ready-to-work list, whether the work cell device or devices in the work cell are ready to work. If the device is ready to work, in one embodiment, this means the network is active, the work cell device is active, the work cell device has not faulted, and the device has completed the prior task. If the device is not ready to work, the method 500 returns to block 505 (after a delay) to again request the ready-to-work list from the work cell.

In another embodiment, assuming the work cell device is ready to work, the orchestrator may check whether the results of performing the first task was received during the loop defined by blocks 505, 510, and 515 which allows the orchestrator to skip the remaining blocks in the method 500. For example, the work cell device may have been blocked from performing the first task which caused the task to time out. However, when performing the blocks 505, 510, and 515, the work cell device may have completed the first task and the local controller reported the results to the orchestrator. The orchestrator use the results to select the second task rather than performing the remaining blocks in the method 500.

Assuming the work cell device is ready to work and the results have not been received, the method 500 proceeds to block 520 where the orchestrator requests the sensor data from the local controller in the work cell. The requested sensor data may be similar to the sensor data received at block 310 of the method 300. The sensor data can indicate the current location of an item in the work cell. For example, the location of the item may have changed after the orchestrator issued the first task to the work cell. That is, during the network or controller outage, the work cell device may have moved the item.

At block 525, the orchestrator determines the state of the work cell from the sensor data. That is, the orchestrator can identify the location of the item or items in the work cell. For example, in response to receiving the task, the work cell device may have moved the item from an input station to an output station. A sensor at the input station can indicate, in response to the request transmitted at block 520, that it no longer contains an item while a second sensor at the output station indicates it now contains an item. Thus, the orchestrator can determine that the item has changed locations during the network or controller outage without being told of the move from the local controller.

The orchestrator can also determine the orientation or configuration of the work cell device for the sensor data. For example, during the outage, a robotic arm may have moved to a different position than it was at before the first task was transmitted to the work cell. The work cell may include internal sensors on the robotic arm that report its current configuration in response to the request sent at block 520. In another example, the work cell may include a camera above the work cell which can capture images of the work cell. By comparing an image taken before the first task was assigned to an image captured after the outage, the orchestrator can determine the current configuration of the work cell device (e.g., if the robotic arm has moved or if an item has moved down a conveyor belt) to determine the current state of the work cell which, in this example, includes the location of an item and/or a configuration of the work cell device.

In one embodiment, at block 530, the orchestrator infers the results of performing the first task using the state of the work cell. That is, the orchestrator retrospectively determines whether the first task was completed successfully. For example, if at block 525 the orchestrator determines that an item was moved from Input Station A to Output Station C, but the first task was to move the item from Input Station A to Output Station B, the orchestrator can determine the first task was not performed correctly. In another example, if at block 525 the orchestrator determines that a robotic arm is currently hovering over Output Station B (which is a chute to a pallet box) and the first task was for the robotic arm to drop the item into the Output Station B, then the orchestrator infers that the first task was completed successfully (even without detecting the location of the item). In another example, the orchestrator can use the sensor data to infer the results of non-move operations such as transformations of an item or package—e.g., labeling a package, banding a package with other packages, etc.). In this manner, the orchestrator can determine a state of the work cell and then retroactively determine if the previous task was completed successfully.

However, the orchestrator does not need to infer the results of performing the first task at block 530. For example, the orchestrator may include a state machine which can determine how to proceed next without determining whether the previous task was completed successfully or not. Instead, the orchestrator can decide the next task for the work cell based solely on the current state of the work cell as deduced from the sensor data.

At block 535, the orchestrator determines a second task using the state of the work cell. Using a current location of an item in the work cell or a current configuration of the work cell device, the orchestrator determines the next task for the work cell. For example, the inventory tracking system may have instructed the work cell to move the item to Output Station B. If the state of the work cell indicates the item is at Output Station C, the orchestrator generates a second task to move the item from Output Station C to the Output Station B.

Moreover, the orchestrator can determine the second task in response to retroactively determining whether the first task was performed successfully. For example, if the first task was successful, the orchestrator can report this information to the inventory tracking system which can update information regarding a package affected by the first task and then provide a new task for the orchestrator to perform at that same work cell (with a different item or the same item), or a new task for a work cell that received the item as a result of performing the first task. For example, the orchestrator may transmit the state of the work cell to the inventory tracking system which includes a state of an item in the work cell that was affected (e.g., moved, banded, labeled, etc.) by the first task. The inventory tracking system can then provide an instruction to the orchestrator for determining the next action to take. In this manner, determining the state of the work cell and retroactively determining whether the previous task was completed successfully can be used to determine the next task for the work cell (or a work cell that received the item). In this manner, the orchestrator can recover from communication errors due to an outage. That is, the orchestrator can determine the state of the work cell (and the results of performing the previous task) which can then be used to determine the next task. At block 540, the orchestrator instructs a work cell to perform the second task.

Figure 6:
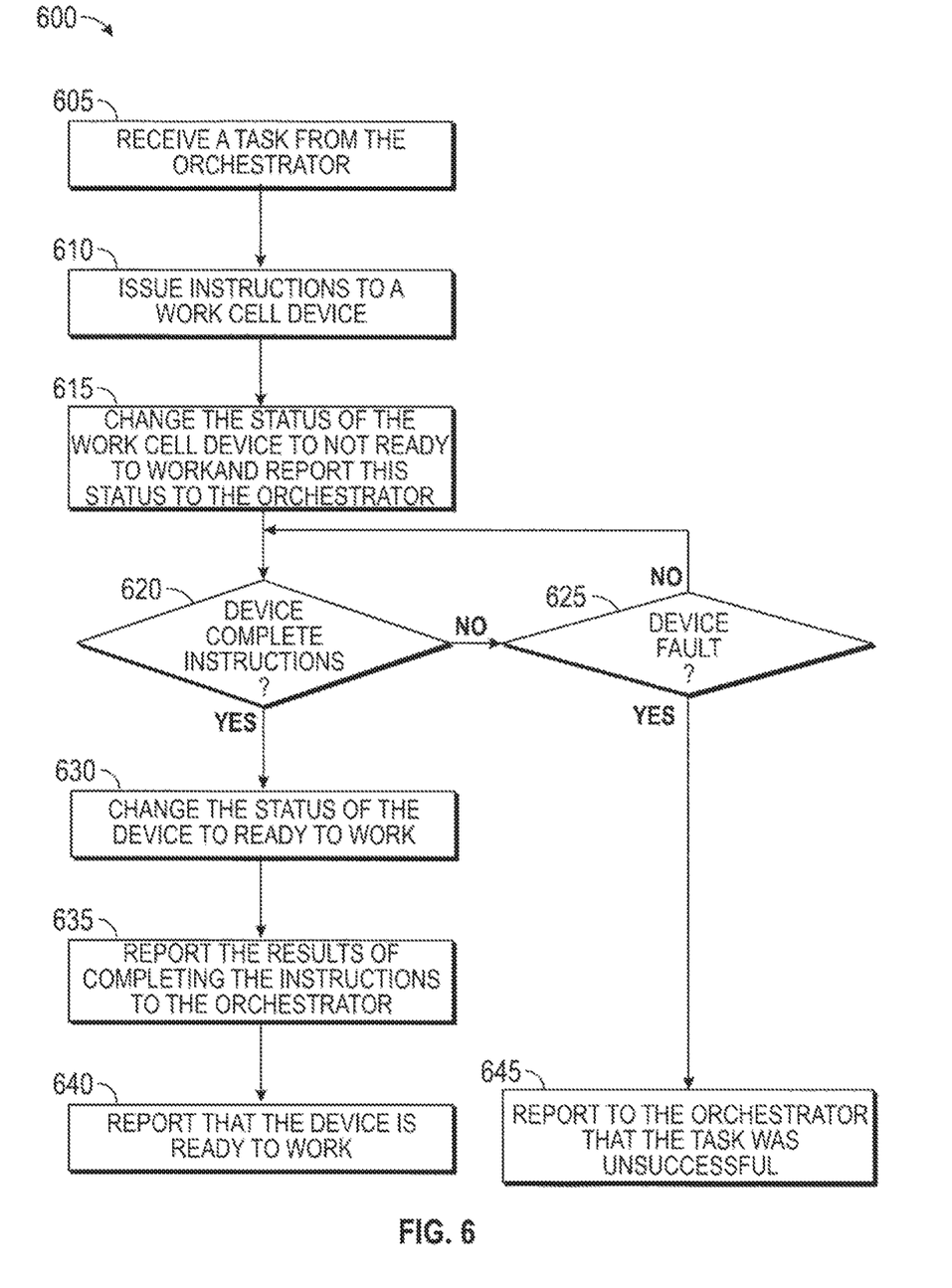
FIG. 6 is a flowchart for performing instructions received from a remote work cell orchestrator using a local controller, according to various embodiments.

FIG. 6 is a flowchart of a method 600 for performing instruction received from a remote work cell orchestrator using a local controller, according to various embodiments. At block 605, the local controller receives a task from the orchestrator. At block 610, the local controller issues instructions to a work cell device. In one embodiment, the local controller may use the received task to select or identify a plurality of instructions for the work cell device. For example, the task may be high-level or goal orientated task such as moving an item from a first location to a second location, or placing a component onto a pre-assembled product. However, the instructions issued by the local controller may include a series of low-level or granular commands such as a first instruction to a first conveyor belt to move an item a set distance, a second instruction for an actuator on the first conveyor belt to push the item onto a second conveyor belt, and a third instruction for the second conveyor belt to dispose the item into a pallet box located at the end of the belt. In one embodiment, the local controller may store predefined mappings between the tasks issued by the orchestrator and respective sets of instructions for performing those tasks. However, in other embodiments, the orchestrator may transmit low-level instructions which the local controller relays to the work cell device or devices.

At block 615, the local controller changes the status of the work cell device to not-ready-to-work in response to issuing the instructions at block 610 and reports this status change to the orchestrator.

At block 620, the local controller determines whether the work cell device has completed the instruction or instructions. If not, the method 600 proceeds to block 625 where the local controller determines whether the work cell device has faulted. For example, the work cell device may transmit an error signal to the local controller as a result of a mechanical failure (e.g., a component breaks or there is a jam). If there is a fault, the method 600 proceeds to block 645 where the local controller reports to the orchestrator that the task was unsuccessful. The local controller may indicate there was a fault in the work cell device so that the orchestrator knows the device is still in the not-ready-to-work-state because of the fault.

However, assuming the device does not experience a fault, the method 600 returns to block 620 until the device completes the instructions. In this example, the device may complete the task successfully or unsuccessfully. That is, block 620 indicates the work cell device completed the task without experiencing a mechanical failure that prevented it from completing the task; however, the task may still have been performed incorrectly. For example, when moving the item, the item may have slipped from the grasp of a robotic arm and landed in the wrong output station. Or when moving down a conveyor belt an actuator may have failed to push the item into a chute. Thus, the work cell device may have performed the instructions issued by the local controller even though the work cell failed to complete the task assigned by the orchestrator. The local controller can use the sensors in the work cell and in the work cell device to determine whether the task was completed successfully.

At block 630, the local controller changes the status of the device to ready-to-work. Put differently, whether the task was completed successfully or unsuccessfully, the device has performed the instructions issued by the local controller, and thus, can perform another task.

At block 635, the local controller reports the results of completing the instructions to the orchestrator. That is, the local controller informs the orchestrator whether the task was performed successfully or not. At block 640, the local controller reports to the orchestrator that the device is ready to work. Thus, if the task was not completed successfully, the orchestrator may issue the same task or a corrective task to the local controller. If the task was successful, the orchestrator can send a new task to the work cell regarding a different item or a new task to a different work cell under control of the local controller.

The method 600 describes one example of logic performed by the local controller when there is no communication error between the controller and the orchestrator. However, if the local controller experiences an error and re-boots, or a network outage causes the orchestrator not to receive the reports generated at blocks 635, 640 and 645, the methods 400 and 500 illustrates a recovery process that the orchestrator can perform with the aid of the local controller in order to recover from the communication error.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the work cell orchestrator) or related data available in the cloud. For example, the orchestrator could execute on a computing system in the cloud and provide tasks to the work cell. In such a case, the orchestrator could issue tasks to multiple work cells and store the results of performing those tasks at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system comprising:
a facility comprising a plurality of work cells, each of the plurality of work cells comprising a local controller and an automated machine;
a cloud-based orchestrator communicatively coupled to the plurality of work cells via a network, wherein the cloud-based orchestrator is configured to:
instruct a first work cell of the plurality of work cells to perform a first task;
determine that results of performing the first task were not received from the local controller in the first work cell thereby indicating that at least one of a network outage and a failure of the local controller in the first work cell has occurred;
receive a message indicating the automated machine in the first work cell has a ready-to-work status;
determine that at least one of the network outage and the failure of the local controller has occurred after receiving the message indicating the automated machine in the first work cell has the ready-to-work status and before receiving results of performing the first task;
request sensor data from the first work cell;
infer retroactively whether the first task was performed successfully in the first work cell based on the requested sensor data; and
instruct the first work cell to perform a second task based on the inference.

2. The system of claim 1, wherein the cloud-based orchestrator is configured to:
determine that at least one of the network outage and the failure of the local controller has occurred in response to a timer expiring before receiving results of performing the first task.

3. The system of claim 1, wherein the first task comprises moving an item within the first work cell, wherein the requested sensor data indicates a location of the item in the first work cell, wherein the location indicates whether the first task was performed successfully in the first work cell.

4. The system of claim 1, wherein the sensor data indicates a configuration of the automated machine in the first work cell, wherein the configuration of the automated machine in the first work cell indicates whether the first task was performed successfully.

5. The system of claim 1, wherein the cloud-based orchestrator is configured to after determining that at least one of the network outage and the failure of the local controller has occurred:
    request that the local controller in the first work cell indicate whether the automated machine in the first work cell is in the ready-to-work state.

6. A method, comprising:
    instructing a work cell to perform a first task using a network connected orchestrator, wherein the work cell comprises a local controller and a work cell device;
    determining that a communication error prevented the network connected orchestrator from receiving results of performing the first task from the local controller;
    request sensor data from the work cell after determining that the communication error prevented the network connected orchestrator from receiving the results of performing the first task;
    receive a message indicating the work cell device has a ready-to-work status;
    determining a state of the work cell based on the sensor data; and
    instructing the work cell to perform a second task based on the state of the work cell and the ready-to-work status.

7. The method of claim 6, wherein the work cell is disposed at a location remote from the network connected orchestrator.

8. The method of claim 6, wherein determining the state of the work cell based on the sensor data comprises:
    inferring retroactively whether the first task was performed successfully in the work cell.

9. The method of claim 6, wherein the first task comprises moving an item within the work cell, wherein the requested sensor data indicates a location of the item in the work cell, wherein the location is used to determine the state of the work cell.

10. The method of claim 6, wherein the sensor data indicates a configuration of the work cell device, wherein the configuration of the work cell device is used to determine the state of the work cell.

11. The method of claim 10, further comprises:
    transmitting the state of the work cell to an inventory tracking system, wherein the state of the work cell indicates a state of an item affected by the first task;
    receiving an instruction from the inventory tracking system regarding a next action to take; and
    determining the second task based on the instruction received from the inventory tracking system.

12. The method of claim 6, wherein determining that the communication error prevented the network connected orchestrator from receiving results of performing the first task from the local controller further comprises:
    receiving the message indicating the work cell device has the ready-to-work status before receiving results of performing the first task.

13. The method of claim 6, further comprising:
    requesting, after determining the communication error, the local controller indicate whether the work cell device is in the ready-to-work state; and
    waiting to receive the message indicating the work cell device has the ready-to-work status before instructing the work cell to perform the second task.

14. A computer-readable storage medium comprising computer-readable program code embodied therewith, the computer-readable program code executable by a processor to perform an operation, the operation comprising:
    instructing a work cell to perform a first task using a network connected orchestrator, wherein the work cell comprises a local controller and a work cell device;
    determining that a communication error prevented the network connected orchestrator from receiving results of performing the first task from the local controller;
    request sensor data from the work cell after determining that the communication error prevented the network connected orchestrator from receiving the results of performing the first task;
    receive a message indicating the work cell device has a ready-to-work status;
    determining a state of the work cell based on the sensor data; and
    instructing the work cell to perform a second task based on the state of the work cell and the ready-to-work status.

15. The computer-readable storage medium of claim 14, wherein determining the state of the work cell based on the sensor data comprises:
    inferring retroactively whether the first task was performed successfully in the work cell.

16. The computer-readable storage medium of claim 14, wherein the first task comprises moving an item within the work cell, wherein the requested sensor data indicates a location of the item in the work cell, wherein the location is used to determine the state of the work cell.

17. The computer-readable storage medium of claim 14, wherein the sensor data indicates a configuration of the work cell device, wherein the configuration of the work cell device is used to determine the state of the work cell.

18. The computer-readable storage medium of claim 14, wherein determining that the communication error prevented the network connected orchestrator from receiving results of performing the first task from the local controller further comprises:
    receiving the message indicating the work cell device has the ready-to-work status before receiving results of performing the first task.

19. The computer-readable storage medium of claim 14, wherein the operation further comprises:
    requesting, after determining the communication error, the local controller indicate whether the work cell device is in the ready-to-work state; and
    waiting to receive the message indicating the work cell device has the ready-to-work status before instructing the work cell to perform the second task.

* * * * *